March 31, 1931.  J. A. ALLEN  1,798,776
AUTOMATIC WEIGHING MEANS FOR TOBACCO SCRAP
Filed Aug. 25, 1928  3 Sheets-Sheet 1
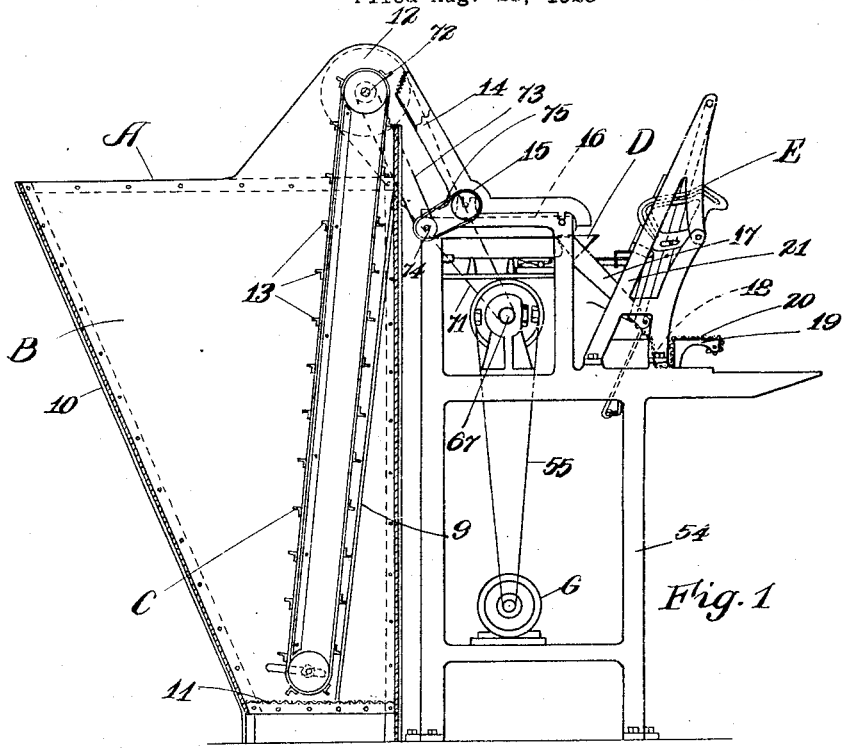
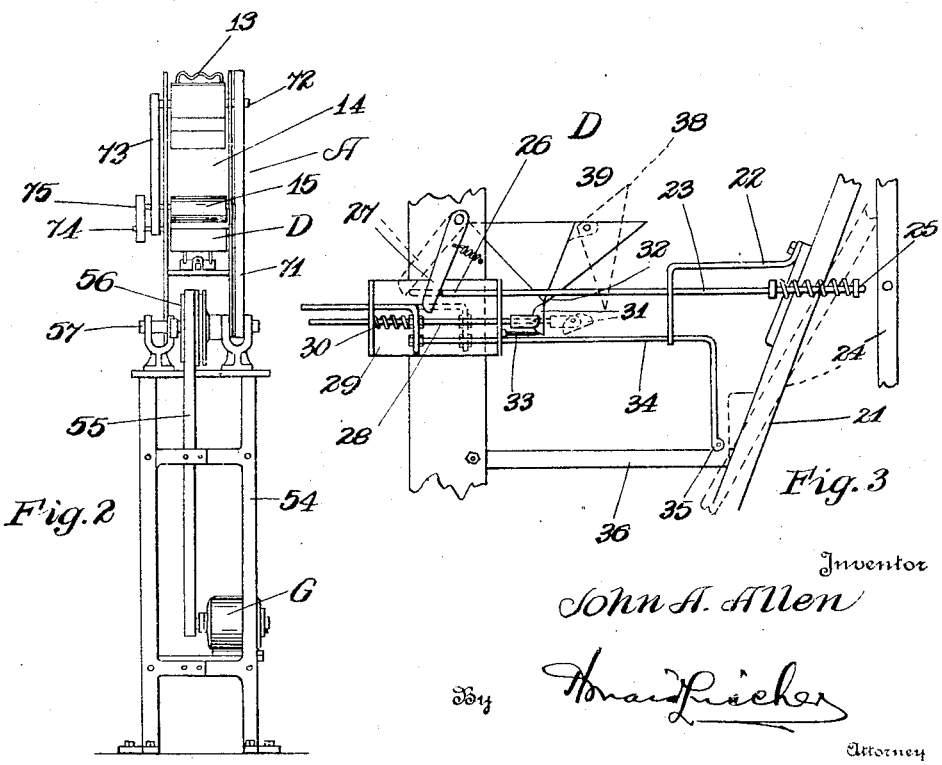
Inventor
John A. Allen
By Howard Fincher
Attorney

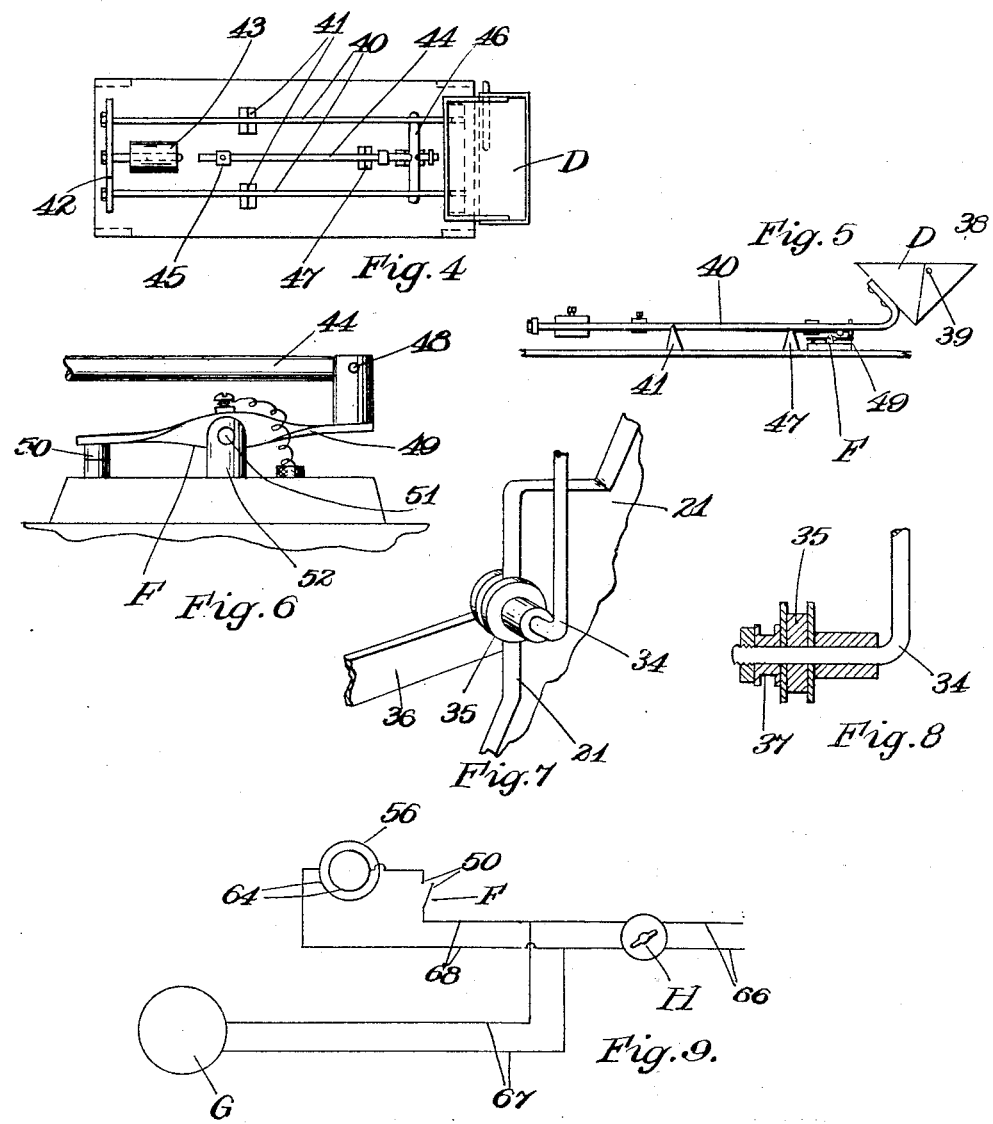

March 31, 1931. J. A. ALLEN 1,798,776
AUTOMATIC WEIGHING MEANS FOR TOBACCO SCRAP
Filed Aug. 25, 1928 3 Sheets-Sheet 3

Inventor
John A. Allen
By Howard Fischer
Attorney

Patented Mar. 31, 1931

1,798,776

UNITED STATES PATENT OFFICE

JOHN A. ALLEN, OF ST. PAUL, MINNESOTA

AUTOMATIC WEIGHING MEANS FOR TOBACCO SCRAP

Application filed August 25, 1928. Serial No. 302,095.

My invention relates to an automatic means of handling tobacco scrap and measuring the same in pre-determined quantities together with means for operating the measuring mechanism in conjunction with rolling mechanism for making cigars. The tobacco scrap is used as a filler for cigars and to provide uniformly shaped and sized cigars it is essential that each cigar contain the same amount of tobacco scrap as it is ordinarily termed.

My automatic measuring device includes a particular means operated by the weight of the scrap for releasing and starting the operating mechanism to carry the tobacco scrap into the weighing cup. This includes a clutch device which is operated by electrical means so as to quickly operate the mechanism of my machine to carry tobacco scrap into the weighing cup. It is an important feature of my invention to provide mechanism that may be operated continually in the handling of tobacco scrap without easily getting out of order and having a delicate weighing means which operates the electrical switch means and which will not easily get out of order. I have accomplished these results by a clutch pulley device which operates in such a manner as to be virtually instantaneous in operation and thus largely overcome lost motion in the operation of the elevating and distributing means for the scrap to convey the same to the weighing cup.

In my automatic weighing tobacco scrap machine I have provided a particular hopper means which includes an elevator member extended into the hopper in such a manner as to automatically feed the scrap to the conveyor. This permits the conveyor to virtually empty the hopper of the tobacco scrap in its operation. This means of my device is important in that it permits a supply of tobacco scrap to be dumped into the hopper and the conveyor automatically feeds the scrap out to the spreading means, and the spreading means carries the scrap to the weighing cup. The conveyor is automatically operated by the weighing cup and in the operation of the rolling mechanism the weighing cup is dumped automatically. The moment that the weighing cup is dumped of its contents the weighing mechanism associated with the weighing cup causes a circuit to be made with the operating pulley clutch which instantly operates the conveying means and spreader mechanism. All of these parts are timed to operate together with a minimum lost motion and thus it will be apparent that it is important to provide a particular mechanism which is adapted to operate virtually instantly at the desired moment.

In the drawings forming part of my specification:

Figure 1 is a side view partly in section of my automatic tobacco scrap machine.

Figure 2 is a front view of the same.

Figure 3 is a detail of the weighing cup and releasing mechanism.

Figure 4 is a plan view illustrating a detail of the weighing cup and connecting parts.

Figure 5 is a side view of the same, illustrating the electrical switch operated by the weighing cup.

Figure 6 is an enlarged detail of the electrical switch of the weighing cup.

Figure 7 is an enlarged detail of a portion of the arm operated by the rolling mechanism and showing the roller end of the resetting arm for the catch mechanism for the weighing cup.

Figure 8 is a sectional illustration of the roller described in Figure 7.

Figure 9 is a wiring diagram diagrammatically showing the wiring of my automatic tobacco scrap machine.

Figure 10:
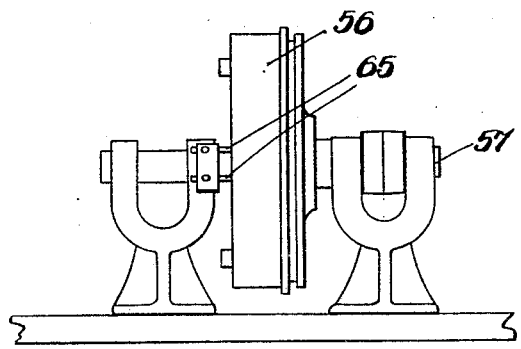
Figure 10 is a front view of the pulley clutch and counter shaft employed in operating my machine.

My automatic tobacco scrap machine A is provided with a hopper B having inclined walls 9 and 10 which direct the tobacco scrap placed in the hopper B to the conveyor C.

The conveyor C extends from the bottom 11 of the hopper B to the upwardly projecting end 12 and is formed with lifters 13 on the belt of the same which pick up a certain amount of tobacco scrap and carry it up to the slide 14.

The slide 14 leads to a spreading roller 15 and after the tobacco scrap has slid down the slide 14 to the spreading roller 15, the roller 15 carries the same on to a short conveyor 16 which leads to the weighing cup D. In the operating of the conveyor C the tobacco scrap is carried up as just described and discharged into the weighing cup D.

The weighing cup D is positioned at the forward side of the tobacco scrap machine A and is associated with the chute 17 which leads from the weighing cup B to the recess 18 in the rolling table 19 of the rolling mechanism E, directly in front of the weighing cup D.

The rolling mechanism operates in a manner to roll the flexible belt 20 over the tobacco scrap dumped into the recess 18 and by means of a tobacco leaf cover the scrap is rolled by the rolling mechanism E in the operation of the flexible belt 20 so as to roll the scrap into the cover or roll the cover about the scrap. The cup D weighs out a uniform amount of tobacco scrap each operation. The rolling mechanism is provided with a frame portion 21 which carries a bracket arm 22 adapted to support an operating rod 23. The operating rod 23 is adapted to be engaged by the lever 24 which strikes against the end 25 of the rod 23 when the lever 24 is pushed toward the end 25 in the operation of the rolling mechanism E. The operating lever 24 is connected to the flexible belt 20 of the rolling mechanism E in a manner to roll the tobacco scrap up in a tobacco leaf cover when the lever 24 is pulled forward toward the outer front end of the table 19.

The backward stroke of the lever 24 strikes the rod 23 and causes the end 26 of the rod 23 to force the dog 27 out into the position illustrated in dotted outline in Figure 3 which releases the spring catch 28. The spring catch 28 is carried by the bracket 29 and is provided with an operating spring 30. A latch member 31 is provided on one end of the spring catch rod 28 and the latch member is pivoted so that in the backward stroke of the same it will pass under the edge 32 of the weighing cup D. As the spring catch 28 is moved into setting position, the latch member 31 strikes against the adjustable rod 33 to reset the latch member 31 into the position illustrated in full lines in Figure 3. The rod 33 is threaded, and screws into the bracket 29, being held in any desired position by means of a lock nut. The resetting of the spring catch 28 is accomplished by the operating rod 34 which is provided with a roller end 35 which is engaged by the lever 24 in its backward movement, as illustrated in dotted outline in Figure 3. I provide a guide bar 36 in which the roller 37 is adapted to engage. The roller 37 is positioned adjacent the roller 35 and has a tendency to strengthen and support the free end of the operating rod 34.

The cup D is made split, as illustrated in Figure 3, and the front portion is weighted at 38. This front portion is pivoted at 39 so that when the catch 28 is released the latch 31 will engage the lower free edge of the front portion of the cup and cause the front portion of the cup to tilt as illustrated in dotted outline to dump the contents of the cup into the chute 17, directing the weighed out scrap into the recess 18. These operations are virtually automatic in the dumping of the cup D and the resetting of the catch 28 into operative position.

The cup D is supported to the parallel rods 40 which rest upon the knife edges 41 and which are connected by the bar 42 on the end opposite the cup D. The bar 42 carries an adjustable balancing weight 43. Between the rods 40 I provide an auxiliary balance rod 44 which carries the adjustable weight 45 on one end and which fits through a hole in the bar 46 on the other end which engages under the rods 40. The balance rod 44 is adapted to engage the knife edge 47 and the rod 44 is pivotally connected at 48 with the switch arm 49. The switch arm is positioned virtually directly below the balance rod 44 and an enlarged view of the same is illustrated in Figure 6. The switch arm forms a part of the switch F and when the arm 49 is operated the contact points 50 are opened or closed according to the direction of movement of the arm 49, owing to the fact that the arm 49 is pivotally supported at 51 by the standard 52. The standard 52 is of insulating material and the electrical connection is made direct to the arm 49. Thus one contact point 50 forms one side of the circuit and the other contact the other side. When the arm 49 is operated by the rod 44 to open the switch F, then the contacts 50 are separated and the circuit is broken. When the weighing cup D is filled with tobacco scrap to the desired amount according to the balance weights 43 and 45, then the cup D will balance on the knife points 41 and 47 and tilt sufficiently to open the switch F separating the contact points 50. The operation and the circuit controlled by the weighing cup D which causes my tobacco scrap machine A to operate automatically will be more fully hereinafter described.

My tobacco scrap machine A is adapted to be operated by an electric motor G which is supported in the base frame 54. The motor G is adapted to operate the belt 55 which in turn operates the clutch pulley 56 carried by the counter shaft 57.

Figure 11:
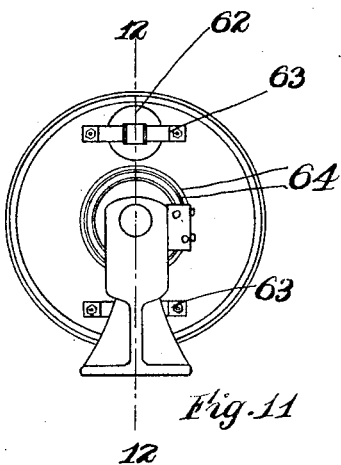
Figure 11 is an end view of the pulley clutch and shaft.

The clutch pulley 56 is of a particular construction being formed with the belt receiving pulley portion 58 and ordinarily the motor G operates continually during the time in which the machine A is in use to continue to drive the pulley 58. Adjacent the pulley 58 the clutch pulley 56 is provided with a clutch plate 59 which is carried by the sleeve 60. A pulley 61 is mounted on the sleeve 60 and ordinarily the sleeve 60 with the clutch plate 57 and the pulley 61 remain stationary on the shaft 57 while the pulley 58 rotates with the shaft. The pulley 58 is provided with operating magnet members 62 which are supported within the pulley 58 by the bracket members 63 illustrated in Figure 11 and also illustrated in Figure 13. I povide two collector rings 64, illustrated in Figures 11 and 12, which feed current to the magnets 62 by means of the brushes 65, illustrated in Figure 10.

In operation the clutch pulley 56 is rotated continually during the use of the machine A by the operation of the motor G and the belt 55. By means of a line-switch H current is directed from the line wires 66 to operate the motor G through the connection of the wires 67. The clutch pulley 56 illustrated diagrammatically in Figure 9, is connected by the wires 68 through the switch F with the line current 66.

Figure 12:
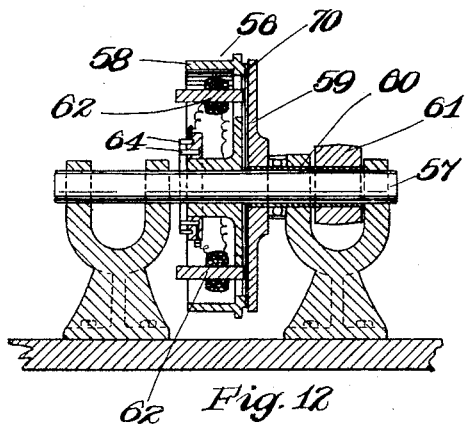
Figure 12 is a section on the line 12—12 of Figure 11.
Figure 13:
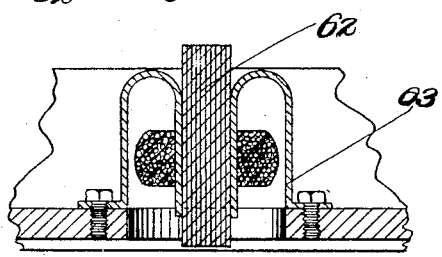
Figure 13 is a sectional enlarged detail of one of the magnets employed in my pulley clutch.

Thus in the operation of my automatic tobacco scrap machine the weighing cup D is adapted to operate the switch F so that when the cup D is empty the switch points 50 are closed, closing the circuit through the collector rings 64 with the magnets 62 and causing the magnets to draw the clutch plate 59 into contact with the clutch surface 70 illustrated in Figure 12, and virtually locking the clutch plate 59 with the pulley 58, causing the pulley 61 to be operated with the clutch pulley 56 as long as the switch F is closed. The pulley 61 is connected by means of the belt 71 with the drive shaft 72 so as to operate the elevator C picking up the scrap by the lifters 13 and carrying it up to the chute 14 which causes the scrap to be directed down on to the spreading roller 15. The drive belt 73 is adapted to extend to the shaft 74 which operates the conveyor 16 leading from the spreader roll 15. A short belt 75 from the shaft 74 extends to operate the spreader roller 15. Thus when the tobacco scrap is discharged into the chute 14 to the spreader roller 15, the spreader roller operates through the belt 73 and the auxiliary belt 75 to spread the tobacco scrap evenly on to the conveyor 16. The conveyor then carries the tobacco scrap forward into the cup D as will be clearly apprehended from Figure 1, and when the weighing cup D is filled with tobacco scrap to the desired amount, the switch F is automatically operated to open the contacts 50 and break the circuit which closes the clutch pulley 56. The operation of the clutch pulley is virtually instantaneous so that the starting and stopping of the conveyor C, the spreader roller 15, and the conveyor 16, is virtually instantaneous and no scrap is carried into the cup after the circuit is broken by the switch F. This is an important feature of my tobacco scrap machine and thus the construction and operation of my clutch pulley 56 is of primary importance, together with the particular arrangement of the switch F for causing the parts to operate automatically. These features together with the formation of the hopper B so that the conveyor C will virtually empty the same of tobacco scrap in operation, are also an important part of my machine.

The weighing cup D is automatically emptied by the operation of the roller mechanism E. Ordinarily the roller mechanism E is operated by hand by the operator who is positioned in front of the machine A and who lays the tobacco leaf cover on the front of the belt 20 on the table 19 and then operates the lever 24 to cause the belt to pick up the tobacco scrap from the pocket 18 and roll it into the tobacco leaf cover in a uniform manner. The fact that the weighing cup D always weighs out the same amount of scrap for each rolling operation is extremely important as in this manner I provide cigars with a body portion formed of tobacco scrap uniformly shaped and of uniform weight. This is a very important feature in the making of cigars. When the operator has completed the rolling operation of the tobacco scrap in the leaf cover, the minute detail of which is not set forth, the lever 24 is pushed backward toward the chute 17 and in pushing this lever 24 backward it is adapted to strike the releasing rod 29 which operates the dog 27 and releases the spring catch 28 which automatically opens the weighing cup D to discharge the tobacco scrap into the chute 17 and permit the scrap weighed out to fall into the pocket or recess 18.

The operation of the lever 24 also resets the latch 31 of the catch 28 so that when the dog 27 is released the latch is adapted to be forced against the lower free edge of the cup D to open the same simultaneously with the releasing of the catch 28. Thus the operation continues in the use of my tobacco scrap machine to operate the conveying and spreading means only when the cup D is empty. My machine is so arranged that the rolling operation of the scrap into a cover tobacco leaf takes virtually the same time as it takes the machine A to fill the cup D with tobacco scrap the desired amount. Thus upon the return movement of the lever 24 the tobacco scrap from the cup D is discharged into the pocket 18. In this manner the operator can continue without interruption and a very large quantity of cigars can be rolled, all of which are uniform, not only in size but in weight and thereby affording a saving in the manufacture which is a material factor. I have found my machine to operate very satisfactorily to accomplish the results desired and in providing a means wherein the tobacco scrap can be handled uniformly and a product may be turned out which has a uniform nature which was difficult to accomplish heretofore.

In accordance with the patent statutes I have described the principles of operation of my automatic tobacco scrap machine and I have endeavored to illustrate the best embodiment thereof in the drawings, however, it is obvious that various changes may be made to one skilled in the art within the scope of the following claims without departing from the purpose and intent of my invention.

I claim:

1. A tobacco scrap machine including, a storage hopper having inclined walls to form a small bottom end with a large upper end, an elevator positioned to operate along one of said walls, a spreader adapted to receive tobacco scrap from said elevator, and a weighing cup adapted to receive the tobacco scrap from said spreader and weigh the same out into a pre-determined amount, and switch means controlled by said cup and adapted to intermittently operate said elevator and spreader.

2. A tobacco scrap handling device including, a receiving hopper, an elevator for raising the tobacco scrap out of said hopper, spreader and carrier means adapted to receive the tobacco scrap from said elevator, a weighing means into which the tobacco scrap is deposited from said spreader and conveying means, and means associated with said weighing means adapted to complete an electric circuit and operate a magnetic clutch to operate said conveyor and spreader means automatically until said weighing means has received the proper amount of tobacco scrap.

3. A tobacco scrap machine comprising, a hopper having converging sides to provide a small end, a conveyor extending into said small end, a spreader, an auxiliary conveyor leading from said spreader, a weighing cup adjacent said auxiliary conveyor, a pulley clutch magnetically operated, a motor for operating said pulley clutch, and a switch operable by said weighing cup to operate said pulley clutch by an electric circuit to cause the conveyor to carry tobacco scrap from said hopper to said spreader and auxiliary conveyor and to said weighing cup when said weighing cup is empty and to automatically release said pulley clutch and stop said conveyor and spreading means when said weighing cup is filled with a pre-determined amount of tobacco scrap.

4. A tobacco scrap machine comprising, means for receiving tobacco scrap in a hopper, means for conveying and spreading the tobacco scrap, means for weighing the tobacco scrap into pre-determined amounts, means for releasing the tobacco scrap from said weighing means, and electrically operated clutch means controlled by said weighing means operating said conveying and spreading means only during the period that said weighing means is empty.

5. A tobacco scrap measuring device including, electric means for operating said device, an electromagentic operated disc clutch and pulley, a conveying and spreading means operated by said pulley, weighing means, and an electric switch means operated by said weighing means adapted to operate said magnetically operated disc clutch and pulley, said conveying and spreading means being adapted to fill said weighing means with a pre-determined amount of tobacco scrap after said weighing means has been emptied of tobacco scrap in the operation of said device.

6. A tobacco scrap weighing device including, means for storing tobacco scrap, means for spreading the tobacco scrap, means for conveying the tobacco scrap to said spreader, means for weighing the tobacco scrap into pre-determined amounts, means for discharging the tobacco scrap from said weighing means, and electrical means for operating said conveying and spreading means automatically from the time said weighing means is emptied until said weighing means is filled with a desired amount of tobacco scrap, and automatically stopping said conveying and spreading means virtually instantly with the filling of said weighing means with the desired amount of tobacco scrap.

7. A tobacco scrap weighing apparatus including, a tobacco scrap storage compartment, a conveyor leading from said storage compartment, means for carrying the tobacco scrap from said conveyor spread out, means for receiving the spread out tobacco scrap from said carrying means, means for rolling the tobacco scrap into a cover, means for releasing the tobacco scrap from said weighing means, and electrical means for instantly operating said conveyor means from said storage compartment to carry tobacco scrap to said weighing means, and means for instantly stopping said conveyor means at the moment said weighing means is filled to the desired amount with tobacco scrap.

8. A tobacco scrap weighing apparatus comprising, a receiving compartment for tobacco scrap, means for carrying the tobacco scrap from said receiving compartment, a weighing means for receiving the tobacco scrap carried from said compartment, a pulley operated by an electric motor, a counter shaft for supporting said pulley, a clutch disc associated with said pulley adapted to operate a second pulley, magnetic means for operating said clutch disc to cause said pulley and clutch disc to operate in unison and thereby operate said second pulley, said second pulley being adapted to operate said carrying means for the tobacco scrap from the receiving compartment, and means operable by said weighing means adapted to operate said magnetic means to operate said clutch disc.

9. A tobacco scrap storing and weighing apparatus including, a weighing cup, electric switch means adapted to be associated with said carrying cup, an electric motor, a pulley and counter shaft operable continually by said motor, a magnetically operated clutch disc and pulley operable by said switch associated with said weighing cup, said switch being adapted to close when said carrying cup is empty to operate said clutch and pulley in a manner to operate conveying means to carry tobacco scrap to said weighing cup.

10. A tobacco scrap weighing apparatus including, a weighing cup, means for discharging the contents automatically out of said weighing cup, means for storing tobacco scrap, means for carrying tobacco scrap from said storage means to said weighing cup, a rolling belt associated with said weighing cup to receive the tobacco scrap therefrom, and electromagnetic means for operating said carrying means to said weighing cup by a switch, operated by said weighing means, which remains closed during the period that said weighing cup is empty.

11. A tobacco scrap weighing device and rolling means including, a scrap receiving pocket, a rolling belt, a weighing cup for tobacco scrap, means for carrying tobacco scrap to said weighing cup, means for releasing the contents of said cup into said pocket associated with said rolling belt, an electrical switch operated by said weighing cup, and a clutch and pulley means magnetically operated by an electric circuit controlled by said switch associated with said cup, whereby said conveying means for tobacco scrap to said cup is operated instantly when said cup is empty and stopped the moment said cup is filled with tobacco scrap.

12. A tobacco scrap weighing apparatus including, a weighing cup, a scrap receiving compartment, a rolling belt associated with said weighing cup to receive the tobacco scrap therefrom, a conveyor and an electric magnetic clutch associated with said conveyor operable by an electric circuit, means associated with said weighing cup for closing the circuit when said weighing cup is empty and breaking said circuit when said cup is filled.

JOHN A. ALLEN.